US012791491B2

(12) United States Patent
Kwon et al.

(10) Patent No.: US 12,791,491 B2
(45) Date of Patent: Nov. 10, 2026

(54) OPTICAL INSPECTION APPARATUS, OPTICAL INSPECTION METHOD, AND OPTICAL INSPECTION SYSTEM INCLUDING OPTICAL INSPECTION APPARATUS

(71) Applicant: Samsung Electronics Co., Ltd., Suwon-si (KR)

(72) Inventors: In Kwon, Suwon-si (KR); Hidong Kwak, Suwon-si (KR); Seongsil Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 72 days.

(21) Appl. No.: 18/823,817

(22) Filed: Sep. 4, 2024

(65) Prior Publication Data

US 2025/0290860 A1 Sep. 18, 2025

(30) Foreign Application Priority Data

Mar. 12, 2024 (KR) ........................ 10-2024-0034731

(51) Int. Cl.

| | |
|---|---|
| ***G01N 21/88*** | (2006.01) |
| ***G01J 4/04*** | (2006.01) |
| ***G01N 21/21*** | (2006.01) |
| ***G01N 21/95*** | (2006.01) |
| ***G01N 21/956*** | (2006.01) |

(52) U.S. Cl.

CPC ............ *G01N 21/8806* (2013.01); *G01J 4/04* (2013.01); *G01N 21/211* (2013.01); *G01N 21/9501* (2013.01); *G01N 2021/8848* (2013.01); *G01N 21/956* (2013.01)

(58) Field of Classification Search

CPC ............. G01N 21/8806; G01N 21/956; G01N 21/9501; G01N 21/211; G01N 2021/8809; G01N 2021/8848; G01J 4/04

See application file for complete search history.

(56) References Cited

U.S. PATENT DOCUMENTS

| | | | | |
|---|---|---|---|---|
| 7,826,047 | B2 | 11/2010 | Shibata et al. | |
| 9,874,526 | B2 | 1/2018 | Liu et al. | |
| 10,488,328 | B2 | 11/2019 | Ünlü et al. | |
| 10,551,320 | B2 | 2/2020 | Haller | |
| 11,796,783 | B2 | 10/2023 | Eizner et al. | |
| 2017/0276613 | A1* | 9/2017 | Liu | G01N 21/9501 |
| 2018/0073979 | A1* | 3/2018 | Cho | H04N 23/56 |

(Continued)

OTHER PUBLICATIONS

D. E. Aspnes and A. A. Studna, "High Precision Scanning Ellipsometer," Appl. Opt. 14, 220-228 (1975) (Year: 1975).*

*Primary Examiner* — Kara E. Geisel
*Assistant Examiner* — Jonathon Cook
(74) *Attorney, Agent, or Firm* — Muir Patent Law, PLLC

(57) ABSTRACT

An optical inspection method may include obtaining polarization information of a reflected light reflected from a working object, illuminating an incident light on the working object and obtaining the reflected light converted to an arbitrary elliptical polarization by being reflected from the working object, nulling the reflected light by using a waveplate and a polarizer, where an initial value of a fast axis of the waveplate is set based on the polarization information, and detecting a defect signal by adjusting the waveplate and the polarizer while maintaining the nulling.

19 Claims, 7 Drawing Sheets

(56) References Cited

U.S. PATENT DOCUMENTS

| | | | | |
|---|---|---|---|---|
| 2019/0361161 | A1* | 11/2019 | Gu ..................... | G01N 21/1717 |
| 2023/0000343 | A1 | 1/2023 | Kim et al. | |
| 2023/0152213 | A1 | 5/2023 | Hidaka | |
| 2023/0187242 | A1 | 6/2023 | Shen et al. | |

* cited by examiner

OPTICAL INSPECTION APPARATUS, OPTICAL INSPECTION METHOD, AND OPTICAL INSPECTION SYSTEM INCLUDING OPTICAL INSPECTION APPARATUS

CROSS-REFERENCE TO RELATED APPLICATION

This application claims priority under 35 U.S.C. § 119 and the benefit thereof to Korean Patent Application No. 10-2024-0034731, filed in the Korean Intellectual Property Office on Mar. 12, 2024, the entire contents of which is incorporated herein by reference.

BACKGROUND OF THE INVENTION

(a) Field of the Invention

The present disclosure relates to an optical inspection apparatus, an optical inspection method, and an optical inspection system including an optical inspection apparatus.

(b) Description of the Related Art

At many steps in the process of manufacturing semiconductors, various optical inspection technologies are used to detect defects, such as whether there are errors in critical dimensions, film thickness, or overlay, or whether there are cracks in the structure or particles on the surface of the structure. Optical inspection technologies can repeat inspections without destroying the target sample, and they are preferred methods of defect detection that provide high stability and throughput in the semiconductor technology field.

Meanwhile, as semiconductor technology has advanced and the size of the pattern of the optical inspection object has become smaller than the wavelength of the light source used in the optical inspection process, the null ellipsometric method, which can perform optical inspection under these conditions, has been developed and is being used. The null ellipsometric method is an optical inspection method that filters signals from defect-free patterns, does not filter signals from defective patterns, and detects signals from unfiltered defective patterns with a detector.

The null ellipsometric method is performed by manually manipulating the waveplate and polarizer to filter the signal from the defect-free pattern. However, such manual operation involves trial and error, so when performing optical inspection by manual operation, the turnaround time (the time required per inspection) increases, and the optical inspection time varies depending on the operation situation, causing inefficiencies in the predictability of the optical inspection process.

SUMMARY OF THE INVENTION

Polarization information of the reflected light reflected from the working object may be obtained before performing optical inspection on the working object, and the initial value of the waveplate and polarizer used in the process of nulling the reflected light may be set based on the polarization information.

An optical inspection method may include obtaining polarization information of a reflected light reflected from a working object, illuminating an incident light on the working object and obtaining the reflected light converted to an arbitrary elliptical polarization by being reflected from the working object, nulling the reflected light by using a waveplate and a polarizer, where an initial value of a fast axis of the waveplate is set based on the polarization information, and detecting a defect signal by adjusting the waveplate and the polarizer while maintaining the nulling.

An optical inspection apparatus may include a light source configured to generate light, a first polarizer configured to convert the light to an incident light that is incident on a working object, where the incident light is a polarized light modified from the light, and a waveplate and a second polarizer configured to null a reflected light converted to an arbitrary elliptical polarized light by reflection of the incident light from the working object and adjusted to magnify a defect signal while maintaining the nulling, where an initial value of a fast axis of the waveplate is set based on polarization information of the reflected light reflected from the working object.

An optical inspection system may include a stage configured to hold a working object, an analyzer configured to analyze polarization information of a reflected light reflected from the working object, an optical inspection apparatus configured to detect a defect signal from the working object, where the optical inspection apparatus may include a light source configured to generate light, an illumination optical module configured to generate an incident light, where the incident light is a polarized light modified from the light, a collection optical module configured to collect the reflected light converted to an arbitrary elliptically polarized light by reflection of the incident light from the working object, where the collection optical module may include a waveplate and a polarizer, the waveplate and the polarizer may be configured to null the reflected lighting and magnify a size of the defect signal while maintaining the nulling, and an initial value of a fast axis of the waveplate is set based on the polarization information, and a detector configured to detect the defect signal, and a controller configured to apply the polarization information to the waveplate and the polarizer.

Polarization information of the reflected light reflected from the working object may be obtained before performing optical inspection on the working object, and the initial value of the waveplate and polarizer used in order to null the reflected light may be set based on the polarization information.

The initial value of the waveplate may have a value capable of linearly polarizing reflected light or a value approximate thereto. Accordingly, the manipulation range of the waveplate to be manipulated in order to linearly polarize the reflected light may be reduced, and the number of trials and errors in the process of manipulating the waveplate can be reduced.

Accordingly, the turnaround time for each optical inspection is reduced, the time required for optical inspection is constant despite variety of operating situations, thereby increasing the predictability of the optical inspection process, and the possibility of errors in optical inspection results is decreased.

DETAILED DESCRIPTION OF THE EMBODIMENTS

Figure 1:
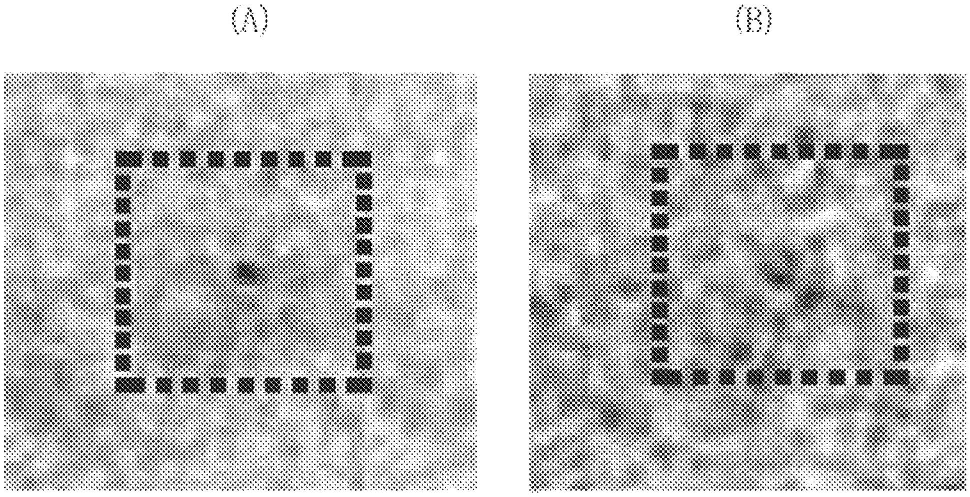
FIG. 1 is an image obtained by performing the conventional optical inspection.

Hereinafter, embodiments of the disclosure will be hereinafter described in detail with reference to the accompanying drawings, such that those skilled in the art may easily implement time. The disclosure may be implemented in various forms, and may not necessarily limited to embodiments described herein.

The drawings and description are to be regarded as illustrative in nature and not restrictive. Like reference numerals designate like elements throughout the specification.

Further, in the drawings, the size and thickness of each element are arbitrarily illustrated for ease of description, and the present disclosure is not necessarily limited to those illustrated in the drawings.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Hereinafter, an optical inspection apparatus 100, an optical inspection system 10, and an optical inspection method of an embodiment will be described in detail with reference to the drawings.

FIG. 1 shows images obtained by performing the conventional optical inspection.

As the semiconductor technology advances, the design rules for memory and logic products have been reduced to their limits, and the size of patterns on optical inspection objects is shrinking. Since microdefects that may occur on these micropatterns directly affect the yield of semiconductor products, it is essential to accurately detect microdefects on the micropatterns. However, the shortest wavelength (approximately 190 nm) of the light source used in the optical inspection process is very large compared to the size of micropatterns or microdefects, which has been reduced with the development of semiconductor technology, so micropatterns and microdefects may be difficult to be resolved to be visible on images obtained from the optical inspection process.

An image (A) is an image where the size of the defect signal is larger than the noise around the defect signal, and is shown for comparison with the image (B). When the size of the defect signal is larger than the noise around the defect signal, the defect is clearly visible, as can be seen in the image in (A). An image (B) is an image where the size of the defect signal is similar to the surrounding noise. In the image (B), defects and noise are not distinguishable in the image. In this way, when the size of the defect signal is similar to the surrounding noise, it can be seen that it is difficult to make an accurate determination as to whether the object has a defect.

Therefore, if the defect signal and noise cannot be distinguished depending on the size difference between the micropattern or the microdefect and the shortest wavelength of the light source used in the optical inspection process, it is necessary to magnify the difference between the size of the defect signal and the noise around the defect signal by performing nulling-based optical inspection in which the defect signal is amplified, and signals other than the defect signal are decayed.

The defect signal on an image obtained in an optical inspection that performs nulling can be defined as follows. Here, I is the image:

$$\text{defect signal} = \text{maximum value}(I(\text{defect}) - I(\text{no defect}) / \text{average value}(I(\text{no defect}))$$

Nulling in optical inspection may be defined as drastically lowering the average signal intensity of a defect-free image. When defects and noise cannot be distinguished on the image, performing nulling to lower average signal intensity of the defect-free image results in relatively enlarging the intensity of the defect signal, and based on this, an accurate determination of whether there is a defect may be made.

Figure 2:
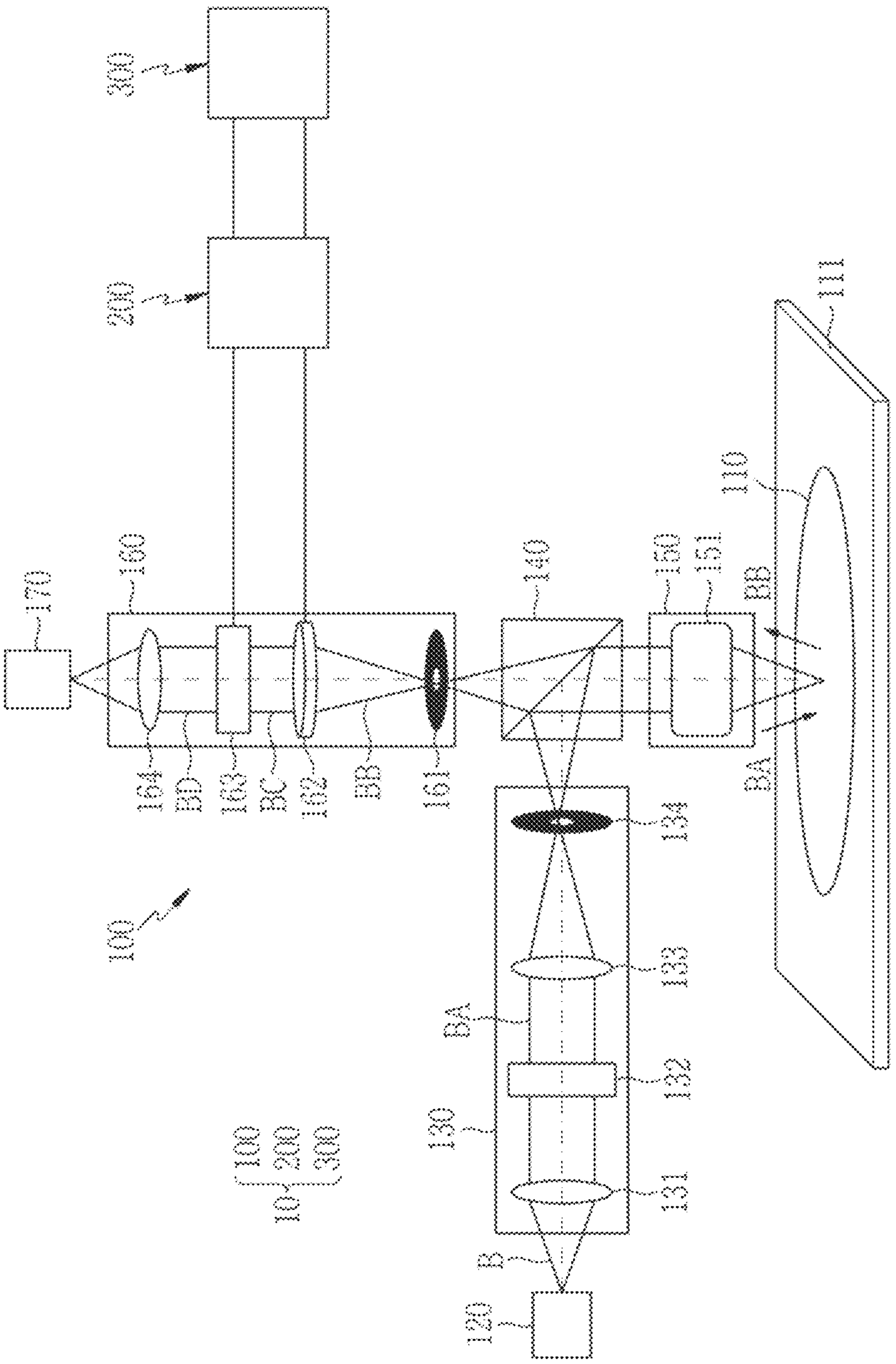
FIG. 2 is a drawing showing an optical inspection system including an optical inspection apparatus of an example embodiment.

FIG. 2 is a drawing showing the optical inspection system 10 including the optical inspection apparatus 100 of an example embodiment.

Referring to FIG. 2, the optical inspection system 10 may include the optical inspection apparatus 100, an analyzer 200, and a controller 300. The optical inspection apparatus 100 may include a light source unit 120, an illumination optical module 130, a beam splitter 140, an optical system 150, a collection optical module 160, and a detector 170.

The light source unit 120 generates light and directs the light to the illumination optical module 130. In an embodiment, a light B generated from the light source unit 120 may include a multicolor light or a monochromatic light. In an embodiment, the multicolor light may include a plurality of wavelength bands in a wavelength range from an ultraviolet wavelength range to an infrared wavelength range.

The light B may have a temporary polarized state. The light B may have wave properties, a polarized light B may propagate in a z direction, and a polarization state of the light B (i.e., light wave) may be defined by two perpendicular components Ex and Ey of electric fields. The components Ex and Ey of the of an electric field may be expressed as an ellipse, and the polarization state of the light B (i.e., light wave) may be defined by an ellipticity $\varepsilon$ and an orientation angle $\alpha$ of a major axis related to the ellipse. The ellipticity $\varepsilon$ may have a value between 0 and 1, and the orientation angle $\alpha$ may have a value between 0 and $\pi$ radians.

The illumination optical module 130 may include a first lens 131, a first polarizer 132, a second lens 133, and a first aperture 134. The first lens 131 may transfer the light B from the light source unit 120 to the first polarizer 132. The first polarizer 132 may convert the light B into the polarized light BA. In an embodiment, the polarized light BA may be linearly polarized. The first polarizer 132 may block components polarized at right angles to the polarized light BA among components of the light B. In an embodiment, the first polarizer 132 may include a polarizing plate or polarizing prism. The second lens 133 may transfer the polarized light BA generated by the first polarizer 132 to the first aperture 134. The first aperture 134 may adjust a size of the polarized light BA. The first aperture 134 may transfer the polarized light BA to the beam splitter 140. In an embodiment, the illumination optical module 130 may not include a waveplate.

The beam splitter 140 may transfer the polarized light BA to the optical system 150 such that the polarized light BA emitted from the illumination optical module 130 may face toward a working object 110, and may transfer the reflected light BB to the collection optical module 160 such that a reflected light BB reflected from the working object 110 may face toward the detector 170.

The optical system 150 may include an objective lens 151. The objective lens 151 may focus the polarized light BA emitted from the beam splitter 140 toward the working object 110 onto the working object 110, and transfer the reflected light BB reflected from the working object 110 to the beam splitter 140.

The working object 110 may be held on the stage 111. For example, the stage 111 may be configured to hold the working object while the working object 110 is inspected. In an embodiment, the working object 110 may be a semiconductor wafer. The polarized light BA incident on the working object 110 may be defined as an incident light, and the polarized light BB reflected from the working object 110 may be defined as a reflected light. The working object 110 may have an anisotropic material property or a pattern shape and structure on the working object 110, which enables an incident light BA incident on the working object 110 to be scattered to an ordinary axis and an extraordinary axis while being reflected from the working object 110. The working object 110 may generate a phase delay and an amplitude change between the ordinary axis and the extraordinary axis, and change a polarization state of the incident light BA. The polarization state (ellipticity ε and orientation angle α) of the incident light BA may be polarization shifted while being reflected by the working object 110, and the reflected light BB may have a polarization state converted from the polarization state of the incident light BA.

When a linearly polarized light as the incident light BA is incident on the working object 110, the reflected light BB may be elliptically polarized. When micropatterns and microdefects are not resolved in the image obtained from the optical inspection process, supposing that a single defect exists on the working object 110, the scattered light is not generated, and information on the micropattern and information on the microdefect may be mixed in 0-th order light. For this reason, the reflected light BB may become elliptically polarized.

The reflected light BB reflected from the working object 110 may be transferred to the objective lens 151 of the optical system 150. The optical system 150 may include a pupil plane PP on a back focal plane of the objective lens 151. The optical system 150 may provide a pupil image on the pupil plane PP. The pupil image may include polarization information of the reflected light BB reflected from the working object 110.

The collection optical module 160 may include a second aperture 161, a waveplate 162, a second polarizer 163, and a third lens 164. The second aperture 161 may adjust a size of the reflected light BB transferred from the beam splitter 140. The second aperture 161 may transfer the reflected light BB transferred from the beam splitter 140 to the waveplate 162.

The waveplate 162 and the second polarizer 163 may amplify the defect signal while nulling the reflected light BB. The waveplate 162 may generate the phase delay between the ordinary axis and the extraordinary axis of the reflected light BB. In an embodiment, the waveplate 162 may include a ¼ waveplate. The ¼ waveplate may generate the phase delay of π/2 radian between the ordinary axis and the extraordinary axis. The ¼ waveplate may convert a linearly polarized light with the ellipticity ε of 0 to a circularly polarized light with the ellipticity ε of 1, and convert a circularly polarized light with the ellipticity ε of 1 to a linearly polarized light with the ellipticity ε of 0. The second polarizer 163 may block the components polarized at right angles with respect to the polarized light. In an embodiment, the second polarizer 163 may include a polarizing plate or polarizing prism.

For nulling, the waveplate 162 may convert the reflected light BB, which is elliptically polarized, into a reflected light BC with the reduced ellipticity ε, and the second polarizer 163 may block the reflected light BC with the reduced ellipticity ε. The reflected light BC with the reduced ellipticity ε may correspond to elliptical polarization close to linear polarization. The reason why the reflected light BB is not converted to the linear polarization but to elliptical polarization close to linear polarization as it passes through the waveplate 162 is because vibration directions for each moving direction of the reflected light BB do not all match in each direction. Accordingly, even if the reflected light BB is nulled by using the waveplate 162 and the second polarizer 163, it may not be ideally nulled. Therefore, while maintaining nulling, the condition in which the size of the defect signal becomes large may be found by adjusting the waveplate 162 and the second polarizer 163. Accordingly, in the case that it is difficult to accurately determine whether a defect exists in the working object 110 since the defect signals and the noise are not distinguished from one another, whether a defect exists in the defective working object 110 may be accurately confirmed by performing nulling, and magnifying the size of the defect signal.

The third lens 164 may transfer a reflected light BD, which is obtained from the second polarizer 163 and in which the size of the defect signal is detected to be high, to the detector 170.

The detector 170 may generate an image with resolved defects.

The analyzer 200 may obtain polarization information of the reflected light BB reflected from the working object 110. The analyzer 200 may derive first polarization information of the reflected light BB by analyzing a polarization state of the reflected light BB, and may derive an initial value of the waveplate 162 from the first polarization information.

In addition, the analyzer 200 may derive second polarization information of the reflected light BC with the reduced ellipticity by analyzing a polarization state of the reflected light BC with the reduced ellipticity after the reflected light BB passes through the waveplate 162, and may derive an initial value of the second polarizer 163 from the second polarization information.

Manually manipulating the waveplate 162 and the second polarizer 163 in order to amplify the defect signal while nulling the reflected light BB may require trial and error, and thus, when an optical inspection is performed by manual manipulation, the turnaround time per inspection may increase, and the time required for the optical inspection may vary according to the manipulation situation such that inefficiency in terms of predictability of the optical inspection process may occur.

In order to reduce a manipulation range of the waveplate 162 to be manipulated in order to linear-polarize the reflected light BB and a manipulation range of the second polarizer 163 to be manipulated in order to block the reflected light BC having reduced ellipticity, and in order to reduce the number of trials and errors during the process of manipulating the waveplate 162 and the second polarizer 163, the first polarization information of the reflected light BB reflected from the working object 110 before performing optical inspection on the working object 110 and the second polarization information of the reflected light BC with the reduced ellipticity may be obtained, and the initial value of the waveplate 162 and the initial value of the second polarizer 163 used for nulling the reflected light BB may be set based on the obtained polarization information. For example, the initial value of the waveplate 162 may be set by the analyzer 200 based on polarization information obtained by the analyzer 200, including the first polarization information of the reflected light BB reflected from the working object 110 and the second polarization information of the reflected light BC with the reduced ellipticity ε. The first polarization information, the second polarization information, the initial value of the waveplate 162, and the initial value of the second polarizer 163 may be predetermined prior to performing the actual optical inspection.

The controller 300 may apply the polarization information derived by the analyzer 200 to the waveplate 162 and the second polarizer 163, and in order to null the reflected light BB, may adjust the waveplate 162 and the second polarizer 163.

Each of the analyzer 200 and the controller 300 may be a computer (or several interconnected computers) and can include, for example, at least one central processing unit (CPU), graphics processing unit (GPU), or the like configured to execute computer program instructions to perform various processes and methods, random access memory (RAM) and read only memory (ROM) configured to access and store data and information and computer program instructions, input/output (I/O) devices configured to provide input and/or output to the analyzer 200 and controller 300 (e.g., keyboard, mouse, display, speakers, printers, modems, network cards, etc.), and storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium) where data and/or instructions can be stored. In addition, each of the analyzer 200 and controller 300 may include antennas, network interfaces that provide wireless and/or wire line digital and/or analog interface to one or more networks over one or more network connections (not shown), a power source that provides an appropriate alternating current (AC) or direct current (DC) to power one or more components of each of the analyzer 200 and controller 300, and a bus that allows communication among the various disclosed components of the each of the analyzer 200 and controller 300.

Figure 3:
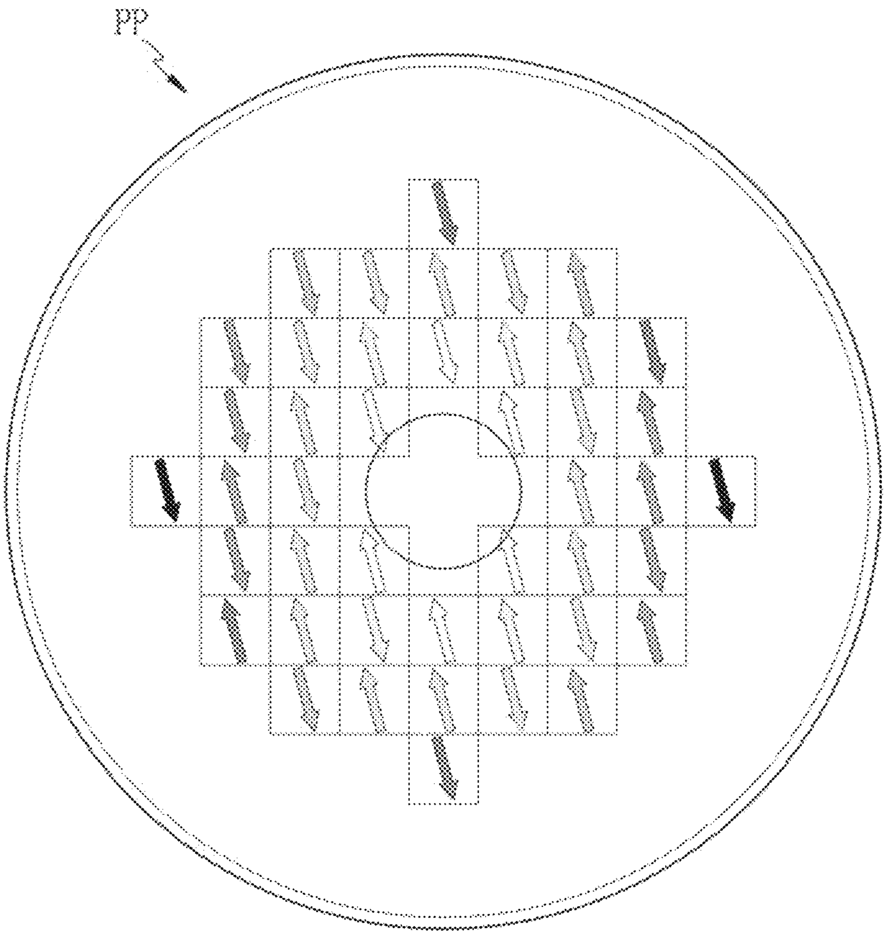
FIG. 3 is a drawing showing polarization information of a reflected light reflected from a working object.
Figure 4:
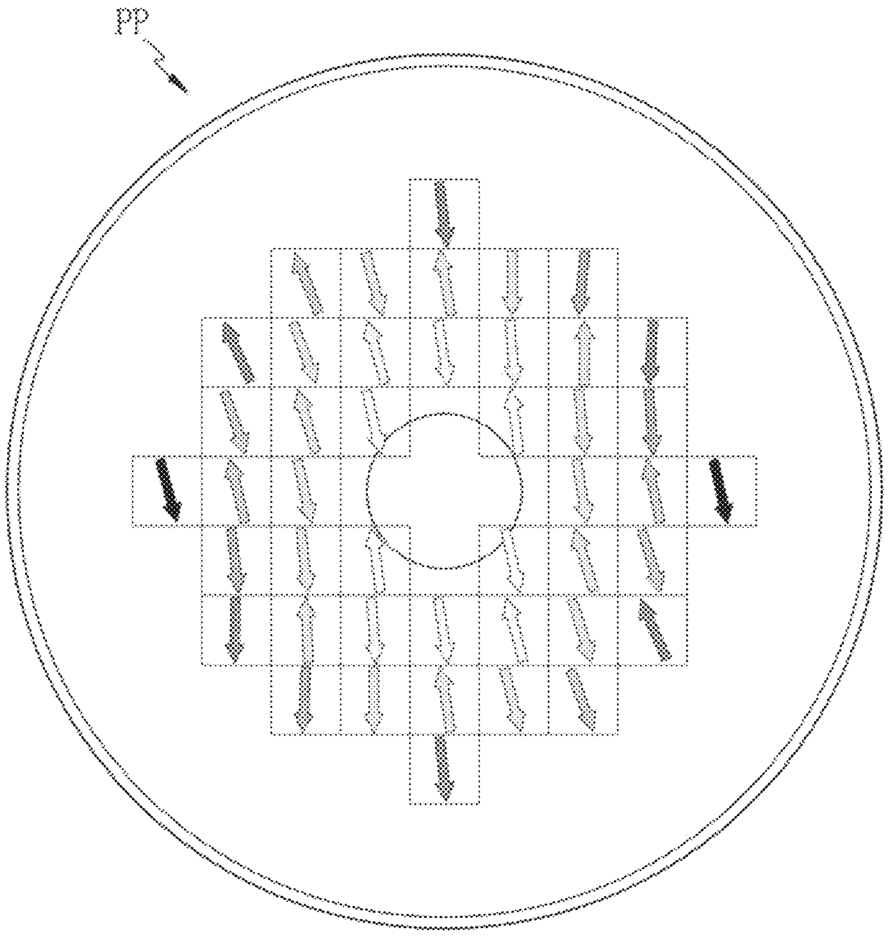
FIG. 4 is a drawing showing polarization information of a reflected light with the reduced ellipticity by passing through the waveplate.

FIG. 3 is a drawing showing polarization information of the reflected light BB reflected from the working object. FIG. 4 is a drawing showing polarization information of the reflected light BC having ellipticity reduced by passing through the waveplate 162.

Referring to FIG. 3 and FIG. 4, when it is difficult to accurately determine whether a defect exists in the working object 110 since the defect signal and the noise are not distinguished from one another, the polarization information of the reflected light BB reflected from the working object 110 before performing an optical inspection for amplifying the defect signal while nulling the reflected light BB and the polarization information of the reflected light BC with the reduced ellipticity may be obtained. For example, the analyzer 200 may obtain the polarization information of the reflected light BB reflected from the working object 110 and the polarization information of the reflected light BC with the reduced ellipticity ε. The polarization information may be represented as the pupil image on the pupil plane PP. The pupil plane PP may include a plurality of regions divided according to moving directions of the reflected light BB or the reflected light BC with the reduced ellipticity ε. The polarization information may be included in each region among the plurality of regions. In an embodiment, the polarization information may be obtained by at least one of simulation and the analysis of the pupil plane according to actual measurement. In an embodiment, simulation may be performed by finite element methods.

Referring to FIG. 3, the first polarization information indicated by an arrow may be displayed in each region among the plurality of regions within the pupil image. The first polarization information may convert the reflected light BB reflected from the working object 110 to components on the pupil plane by Fourier transforming, and may be represented in a method that separates the reflected light BB for each component into a major axis component and a minor axis component having a phase difference of #/2 radian. In an embodiment, the first polarization information may include information on the major axis, minor axis, polarization direction, and intensity of the reflected light BB. In FIG. 3, the arrow corresponds to the major axis component, and the minor axis component is not illustrated. The direction of the arrow may represent the polarization direction, and the difference in shade of the arrow may represent the intensity difference of the reflected light.

The major axis component of the polarization information may be used for setting an angle of a fast axis of the waveplate 162 for nulling the reflected light BB. An initial value of the fast axis of the waveplate 162 may be set as a direction of a vector sum of major axes of the reflected light BB within the plurality of regions. Since the polarization information within each of the plurality of regions within the pupil image has different major axis and intensity, in order to convert various elliptical polarizations to elliptical polarization close to linear polarization by one waveplate, the initial value of the fast axis of the waveplate 162 may be set as the direction of vector sum of the major axes of the reflected light BB within the plurality of regions. In addition, an initial value of a phase shift of the waveplate 162 may be set as $\pi/2$ radian.

As such, the initial value of the fast axis and the initial value of the phase shift of the waveplate 162 may be set to a value capable of linearly polarizing the reflected light BB or a value approximate thereto. Accordingly, the manipulation range of the waveplate 162 to be manipulated in order to linearly polarize the reflected light BB may be reduced, and during the process of manipulating the waveplate 162, the number of trials and errors may be reduced.

Referring to FIG. 4, the second polarization information indicated by an arrow may be displayed in each region among the plurality of regions within the pupil image. The second polarization information may be the polarization information of the reflected light BC with the reduced ellipticity after the reflected light BB passes through the waveplate 162. In an embodiment, the second polarization information may include information on the major axis, minor axis, polarization direction, and intensity of the reflected light BC having ellipticity reduced by passing through the waveplate 162. In FIG. 4, the arrow corresponds to the major axis component, and the minor axis component is not illustrated. The direction of the arrow may represent the polarization direction, and the difference in shade of the arrow may represent the intensity difference of the reflected light.

Figure 5:
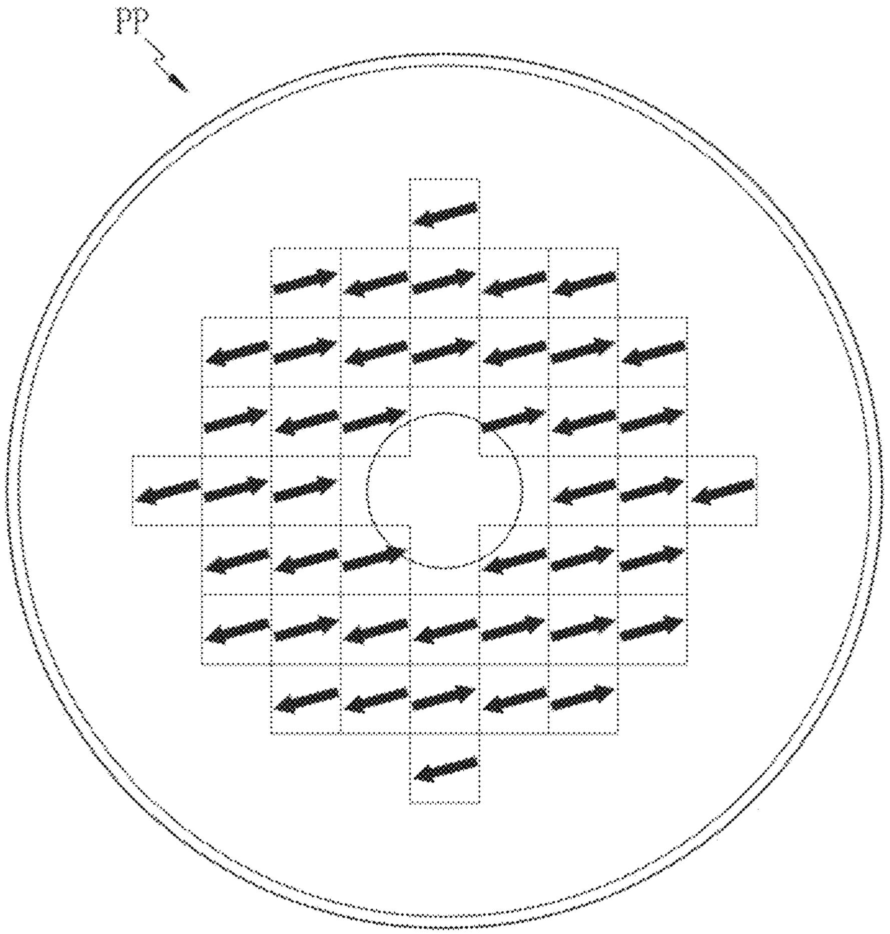
FIG. 5 is a drawing showing setting a polarizer in a direction perpendicular to a vector sum of major axes of the reflected light with the reduced ellipticity.

FIG. 5 is a drawing showing setting the second polarizer 163 in a direction perpendicular to a vector sum of major axes of the reflected light BC with the reduced ellipticity.

Referring to FIG. 5, a direction perpendicular to the major axes of the reflected light BC with the reduced ellipticity is displayed within each region among the plurality of regions within the pupil image. The major axis component of the second polarization information of FIG. 4 may be used for blocking the reflected light BC with the reduced ellipticity. The initial angle of the second polarizer 163 may be set as a direction perpendicular to a vector sum of the major axes of the reflected light BC having reduced ellipticity within the plurality of regions of the second polarization information (or, a direction of the vector sum of directions perpendicular to the major axes of the reflected light BC with the reduced ellipticity). Since the polarization information within each of the plurality of regions within the pupil image has different major axis and intensity, in order to block elliptical polarization close to various linear polarizations by one polarizer, the initial value of the second polarizer 163 may be set as the direction perpendicular to a direction of the vector sum of the major axes of the reflected light BC having reduced ellipticity within the plurality of regions.

As such, the initial value of the second polarizer 163 may be set as a value capable of blocking the reflected light BC with the reduced ellipticity ε. Accordingly, the manipulation range of the second polarizer 163 to be manipulated in order to block the reflected light BC with the reduced ellipticity may be reduced, and the number of trials and errors during the process of manipulating the second polarizer 163 may be reduced.

According to the present disclosure, before performing the optical inspection, in order to convert various elliptical polarizations to elliptical polarization close to linear polarization by one waveplate, the major axis component of the first polarization information may be analyzed and thereby the initial value of the waveplate 162 may be set. In addition, in order to block elliptical polarization close to various linear polarizations by one polarizer, the major axis component of the second polarization information may be analyzed, and the initial value of the second polarizer 163 may be set. Accordingly, the turnaround time per optical inspection may be reduced, the time required for the optical inspection may become constant regardless of manipulation situations such that predictability of the optical inspection process may be increased, and possibility of error in the optical inspection result may be reduced.

Figure 6:
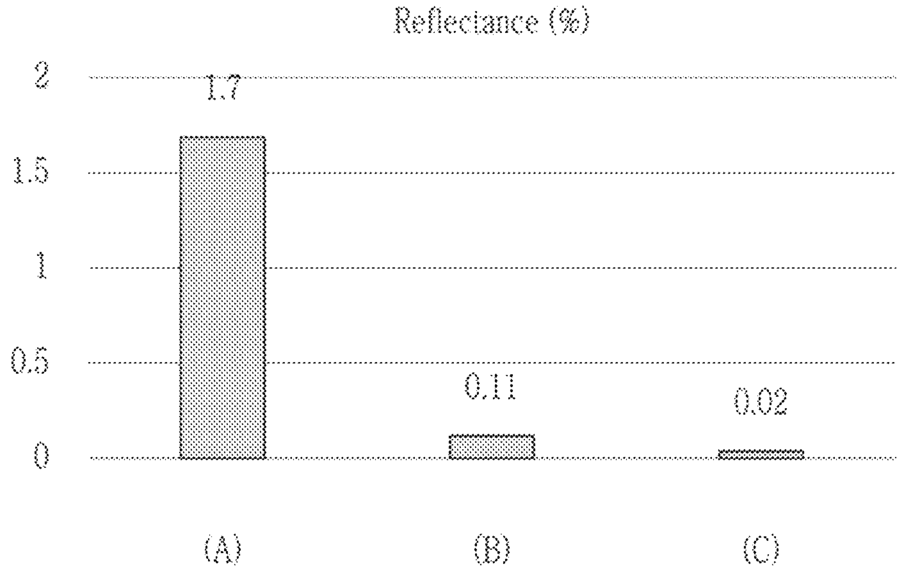
FIG. 6 and FIG. 7 are graphs showing test results according to an example embodiment.
Figure 7:
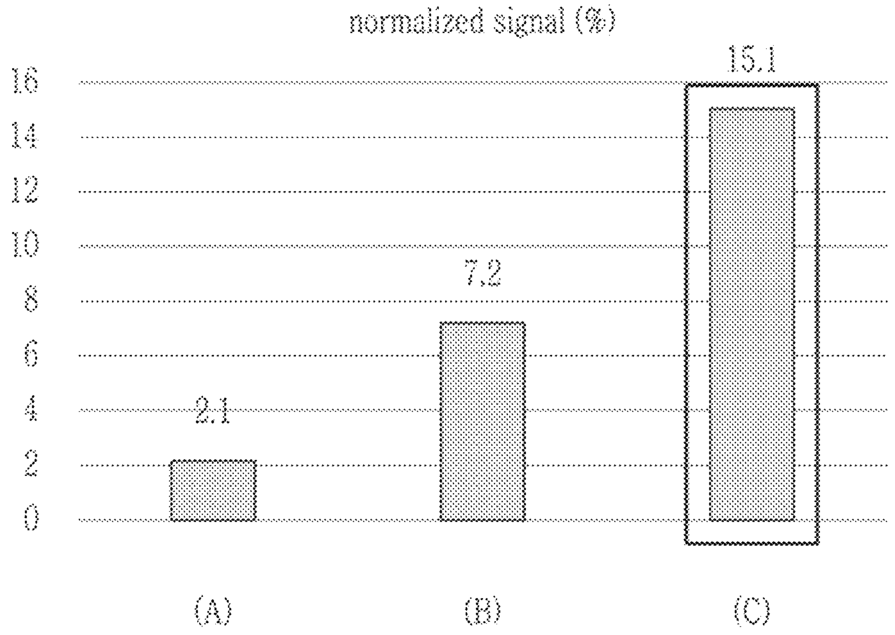

FIG. 6 and FIG. 7 are graphs showing test results according to an example embodiment.

In FIGS. 6 and 7, the graph (A) is a comparative example of optical inspection performed according to the prior art. In the graph (A), the test was performed with the first polarizer 132 at 0 degrees and the second polarizer 163 with no polarization. The graph (B) is a comparative example when only the second polarizer 163 is used in the collection optical module 160. In the graph (B), the test was performed with the first polarizer 132 at 45 degrees, and with the second polarizer 163 at 25 degrees. The graph (C) is a test example when settings according to the present disclosure are applied to the waveplate 162 and the second polarizer 163 in the collection optical module 160. In the graph (C), the test was performed with the first polarizer 132 at 45 degrees, the fast axis of the waveplate 162 at 110 degrees, the phase delay of the waveplate 162 at π/2 radian, and the second polarizer 163 at 15 degrees.

Referring to the graphs, in comparison to the graph (A) of the conventional art and the graph (B) of the comparative example, when the initial value of the waveplate 162 and the second polarizer 163 are set according to the present disclosure, the reflected light BB, which is elliptically polarized, is converted to elliptical polarization close to linear polarization by the waveplate 162, and the reflected light BC with the reduced ellipticity ε is blocked by the second polarizer 163, the total reflectance has decreased from 1.7% to 0.02%, and the relative defect signal (e.g., normalized signal) has been increased from 2.1% to 15.1%.

As such, when the defect and noise are not distinguished on the optical inspection image, by lowering the average signal intensity of defect-free image by performing nulling, the intensity of the defect signal may relatively increase, and whether a defect exists may be accurately determined.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. An optical inspection method, comprising:
- obtaining polarization information of a reflected light reflected from a working object;
- setting an initial value of a fast axis of a waveplate based on the polarization information, wherein the polarization information comprises a plurality of major axes of the reflected light, and the initial value of the fast axis is set as a direction of a vector sum of the plurality of major axes;
- illuminating an incident light on the working object and obtaining the reflected light converted to an arbitrary elliptical polarization by being reflected from the working object;
- nulling the reflected light by using the waveplate and a polarizer; and
- detecting a defect signal by adjusting the waveplate and the polarizer while maintaining the nulling.

2. The optical inspection method of claim 1, wherein an initial value of a phase shift of the waveplate is set as π/2 radian.

3. The optical inspection method of claim 1, wherein the nulling the reflected light by using the waveplate and the polarizer comprises:
- reducing ellipticity of the reflected light by using the waveplate; and
- blocking the reflected light with the reduced ellipticity by using the polarizer.

4. The optical inspection method of claim 1, wherein the polarization information is information formed within a pupil plane by Fourier transforming the reflected light reflected from the working object.

5. The optical inspection method of claim 4, wherein:
- the pupil plane comprises a plurality of regions divided according to moving directions of the reflected light; and
- each region among the plurality of regions comprises the polarization information.

6. The optical inspection method of claim 5, wherein:
- the polarization information comprises a first polarization information; and the first polarization information comprises information on a major axis, a minor axis, a polarization direction, and an intensity of the reflected light.

7. The optical inspection method of claim 6, wherein:

the polarization information further comprises a second polarization information; and the second polarization information comprises information on the major axis, the minor axis, the polarization direction, and the intensity of the reflected light having ellipticity reduced by passing through the waveplate.

8. The optical inspection method of claim 7, wherein an initial angle of the polarizer is set as a direction perpendicular to a vector sum of major axes of the reflected light having reduced the ellipticity within the plurality of regions.

9. The optical inspection method of claim 1, wherein the obtaining the polarization information of the reflected light reflected from the working object is performed when it is determined to be difficult to distinguish the defect signal from a noise.

10. The optical inspection method of claim 1, wherein the polarization information of the reflected light reflected from the working object is obtained by at least one of simulation and analysis of a pupil plane according to actual measurement.

11. An optical inspection apparatus, comprising:

a light source configured to generate light;

a first polarizer configured to convert the light to an incident light that is incident on a working object, wherein the incident light is a polarized light modified from the light;

a waveplate and a second polarizer configured to null a reflected light converted to an arbitrary elliptical polarized light by reflection of the incident light from the working object and adjusted to magnify a defect signal while maintaining the nulling; and an analyzer configured to set an initial value of a fast axis of the waveplate is set based on polarization information of the reflected light reflected from the working object, wherein the polarization information comprises a plurality of major axes of the reflected light, and the initial value of the fast axis is set as a direction of a vector sum of the plurality of major axes.

12. The optical inspection apparatus of claim 11, further comprising a beam splitter configured to direct the incident light on the working object, and direct the reflected light on the waveplate.

13. The optical inspection apparatus of claim 11, wherein the first polarizer is configured to convert the light to linearly polarized light.

14. The optical inspection apparatus of claim 11, wherein the waveplate is a ¼ waveplate.

15. The optical inspection apparatus of claim 11, wherein the waveplate is configured to reduce ellipticity of the reflected light.

16. The optical inspection apparatus of claim 15, wherein the second polarizer blocks the reflected light with the reduced ellipticity.

17. The optical inspection apparatus of claim 11, wherein the polarization information of the reflected light reflected from the working object is predetermined.

18. The optical inspection apparatus of claim 11, wherein the working object comprises a semiconductor wafer.

19. An optical inspection system, comprising:

a stage configured to hold a working object;

an analyzer configured to analyze polarization information of a reflected light reflected from the working object and set an initial value of a fast axis of a waveplate based on the polarization information, wherein the polarization information comprises a plurality of major axes of the reflected light, and the initial value of the fast axis is set as a direction of a vector sum of the plurality of major axes;

an optical inspection apparatus configured to detect a defect signal from the working object, wherein the optical inspection apparatus comprises:

a light source configured to generate light;

an illumination optical module configured to generate an incident light, wherein the incident light is a polarized light modified from the light;

a collection optical module configured to collect the reflected light converted to an arbitrary elliptically polarized light by reflection of the incident light from the working object, wherein the collection optical module comprises the waveplate and a polarizer, and the waveplate and the polarizer are configured to null the reflected light and magnify a size of the defect signal while maintaining the nulling; and a detector configured to detect the defect signal; and a controller configured to apply the polarization information to the waveplate and the polarizer.

* * * * *